(No Model.)

H. C. BATES.
TIRE TIGHTENER.

No. 296,306. Patented Apr. 8, 1884.

Witnesses:
Wm. A. Rosenbaum
G. B. Towles

Inventor:
Henry C. Bates
By W. Burris
Atty

UNITED STATES PATENT OFFICE.

HENRY C. BATES, OF MILES, ASSIGNOR OF ONE-HALF TO ZACHARIAH DE GROAT, OF PRESTON, IOWA.

TIRE-TIGHTENER.

SPECIFICATION forming part of Letters Patent No. 296,306, dated April 8, 1884.

Application filed January 10, 1884. (No model.)

*To all whom it may concern:*

Be it known that I, H. C. BATES, a citizen of Canada, and a subject of the Queen of Great Britain, residing at Miles, in the county of Jackson and State of Iowa, have invented certain new and useful Improvements in Tire-Tighteners for Wheels, of which the following is a description, reference being had to the drawings hereto annexed.

My invention relates to tire-tighteners; and it consists of a wedge-shaped block having its sides depressed to fit the ends of the felly, and an elastic packing inserted between the end of the block and the tire, the block and elastic packing being held in place, and the block adjusted in position to properly tighten the tire by means of a bolt provided with a set-nut, as hereinafter fully described.

Figure 1:
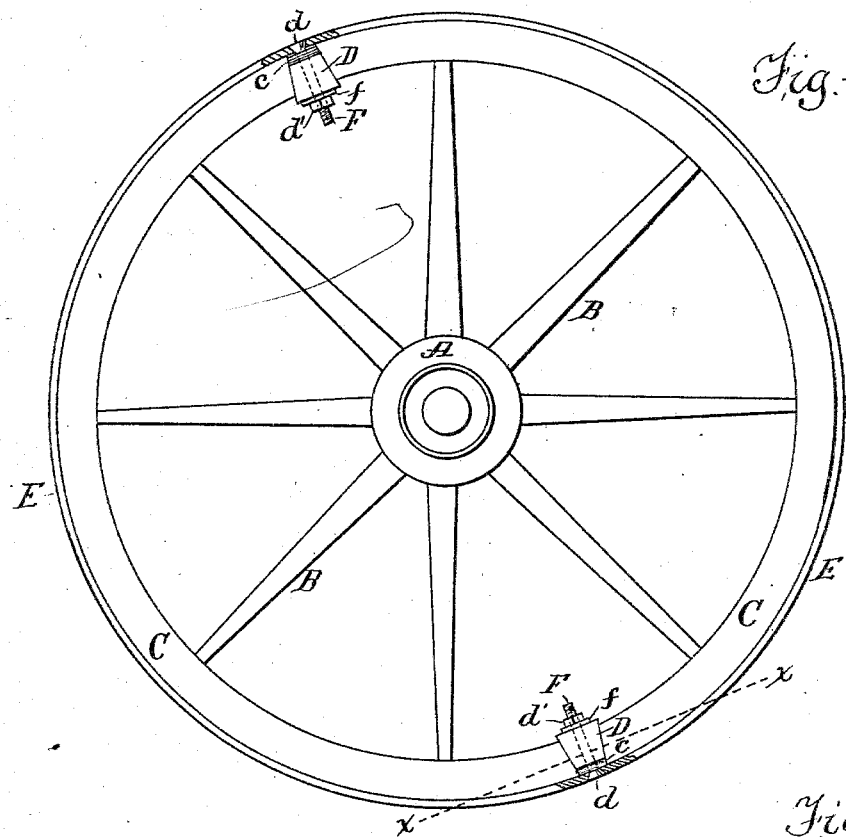
Figure 2:
Figure 3:
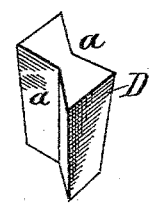
Figure 4:
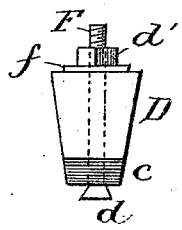

In the accompanying drawings, Figure 1 is a side elevation of a wheel provided with my improved tire-tightener. Fig. 2 is a section on line $x\ x$ of Fig. 1, showing the tire-tightener block in cross-section, inserted between the ends of the fellies. Fig. 3 is a perspective view of the block detached. Fig. 4 is a side elevation of the block, packing, and bolt detached.

A B C designate, respectively, the hub, spokes, and fellies of the wheel.

D designates my tire-tightener block wedge-shaped longitudinally, and having its sides $a\ a$ V-shaped or otherwise depressed to fit the ends $b\ b$ of the fellies, as seen in Figs. 2 and 3 of the drawings. The sides $a\ a$ of the block may be curved or concave shape instead of V shape; but the V shape is preferable, because they may be more readily made to fit and hold in place the ends of the fellies. The space between the outer end of the block D and the tire E is filled with an elastic packing, $c$, which excludes the dirt and aids in holding the block and fellies in place, while it allows all requisite adjustment of the block.

F is a bolt inserted through the tire, the packing $c$, and the block D, and is provided at its outer end with the tapered head $d$, countersunk in the tire, and having its inner end threaded and provided with a set-nut, $d'$. A washer, $f$, may be inserted between the nut $d'$ and the end of the block.

It is evident that one or more of these tightening-blocks, as may be required, may be inserted in a wheel. Usually I insert two of them in an ordinary wheel.

When the tire becomes loose it is tightened by screwing down the nut $d'$ upon the end of the block, which forces the block outward between the ends of the fellies, thus enlarging their circumference and pressing them tightly against the inner surface of the tire, the elastic packing yielding to the outward pressure of the end of the block.

If by the swelling of the wood the tire should become too tight, so as to tend to dish the wheel, the screw-nuts may be turned back, the elastic packing by its expansion aiding in pressing inward the block, keeping the space between the end of the block and tire closely filled and aiding in holding firmly the block and fellies in position.

The set-nuts $d'$ should be made the size to fit the ordinary wrench usually carried with and used upon the nuts of the bolts in the vehicle, so that at any time and place the tire may be tightened or loosened, as required.

I am aware that tapered blocks and other similar devices for tightening tires and elastic cushions interposed between the tire and felly of a vehicle-wheel are old, and I do not claim such a cushion nor such a block, broadly; but

What I claim, and desire to secure by Letters Patent, is—

The combination, with the tapered block D, having its sides $a\ a$ depressed to fit the felly ends $b\ b$, of the elastic packing $c$, inserted in the space between the ends of the fellies and between the end of the block and the tire, substantially as and for the purposes described.

In testimony whereof I affix my signature in presence of two witnesses.

HENRY C. BATES.

Witnesses:
 W. W. SANBORN,
 I. R. ANDREWS.